United States Patent
Bordwell

[11] Patent Number: 5,191,171
[45] Date of Patent: Mar. 2, 1993

[54] ECCENTRIC KNOCKOUTS
[75] Inventor: Mark A. Bordwell, Memphis, Tenn.
[73] Assignee: Thomas & Betts Corporation, Bridgewater, N.J.
[21] Appl. No.: 645,478
[22] Filed: Jan. 23, 1991
[51] Int. Cl.[5] .............................................. B65D 41/32
[52] U.S. Cl. .................................. 174/65 R; 220/3.2; 220/268
[58] Field of Search ............... 174/65 R; 220/3.2, 3.8, 220/266, 268

[56] References Cited
U.S. PATENT DOCUMENTS

| | | | |
|---|---|---|---|
| 1,805,003 | 5/1931 | Newman | |
| 1,850,165 | 3/1932 | Barnett | 220/266 |
| 2,154,310 | 4/1939 | Kinnard | 175/225 |
| 2,240,187 | 4/1941 | Kingdon et al. | 220/27 |
| 2,663,454 | 12/1953 | Olson | 220/268 |
| 2,850,916 | 9/1958 | Kingdon | 74/503 |
| 2,927,149 | 1/1960 | Kern, Jr. | 174/65 R |
| 3,333,501 | 8/1967 | Pitcher | 174/65 R X |
| 3,587,906 | 6/1971 | Pepe | 220/3.2 |
| 3,877,601 | 4/1975 | Evans et al. | 220/3.3 |
| 4,640,433 | 3/1987 | Jorgensen et al. | 220/266 |
| 4,758,180 | 7/1988 | Wills et al. | 174/65 R X |

OTHER PUBLICATIONS

Square D Company, "Safety Socket Boxes", Jun. 1984. One Sheet.

Primary Examiner—Leo P. Picard
Assistant Examiner—David Tone
Attorney, Agent, or Firm—Robert M. Rodrick; Salvatore J. Abbruzzese

[57] ABSTRACT

A circular inner knockout and a non-circular outer knockout formed in a wall are individually connected to the wall by frangible webs located opposite from one another. The frangible web connecting the inner knockout to the wall is stronger than the frangible web connecting the outer knockout to the wall. The periphery of the outer knockout includes by a plurality of interconnected discrete circular curved portions, and does not completely surround the inner knockout.

31 Claims, 2 Drawing Sheets 3. 2

ECCENTRIC KNOCKOUTS

BACKGROUND OF THE INVENTION

This application relates to the art of knockouts that are selectively removable from a wall to provide holes therethrough. The application is particularly applicable to eccentric knockouts in electrical boxes and will be described with specific reference thereto. However, it will be appreciated that the invention has broader aspects and can be used in devices other than electrical boxes.

It is common to provide inner and outer knockouts in the wall of an electrical box for selectively connecting conduit of different sizes thereto. When the knockouts are concentric, a small conduit communicating with the hole provided by removing the inner knockout is connected to the box wall by a fitting that clamps only onto the outer knockout. Forces acting on the fitting or conduit can result in displacement of the outer knockout, and this breaks the connection between the conduit and the box. To overcome this problem, it is known to provide eccentric inner and outer knockouts. Regardless of the conduit size used, the fitting attaching the conduit to the box wall always clamps over a substantial arc directly to the box wall. The joint is thereby able to withstand significant forces applied to the fitting or conduit.

With eccentric knockouts of the type described, the frangible connection between the outer knockout and the box wall must be strong enough to prevent displacement of the outer knockout when the inner knockout is removed. At the same time, the frangible connection between the outer knockout and the box wall must be weak enough to allow easy removal of the outer knockout when so desired. When an eccentric outer knockout is circular and completely surrounds a circular inner knockout, the joint for small conduit is not as strong as it could be if the outer knockout did not completely surround the inner knockout. This is because the fitting for small conduit must span a portion of the outer knockout before directly engaging the box wall.

SUMMARY OF THE INVENTION

Eccentric knockouts of the type described include a circular inner knockout connected with a box wall by a single frangible web. The outer knockout is non-circular, eccentric to the inner knockout, and does not completely surround the inner knockout. The outer knockout is connected to the box wall by a pair of spaced-apart frangible webs located generally opposite from the single web that connects the inner knockout to the box wall. The total combined strength of the pair of webs connecting the outer knockout to the box wall is substantially less than the strength of the single web connecting the inner knockout to the box wall.

The periphery of the outer knockout includes a plurality of interconnected discrete circular curved portions. At least certain of the discrete circular curved portions are curved about different centers. Also, in a preferred arrangement, at least one of the discrete circular curved portions has a longer radius to provide a substantially flatter curvature than other curved portions.

The centers of the radii of curvature for all of the discrete circular curved portions are preferably located on a common diameter of the inner knockout. At least certain of the centers of the radii of curvature are spaced from the center of the inner knockout.

It is a principal object of the present invention to provide an improved eccentric knockout arrangement for connecting conduit to electrical boxes.

It is another object of the invention to provide an improved arrangement for frangibly connecting inner and outer knockouts to a wall.

It is further object of the invention to provide an improved outer peripheral shape for an outer knockout in an eccentric knockout arrangement.

DESCRIPTION OF A PREFERRED EMBODIMENT

Figure 1:
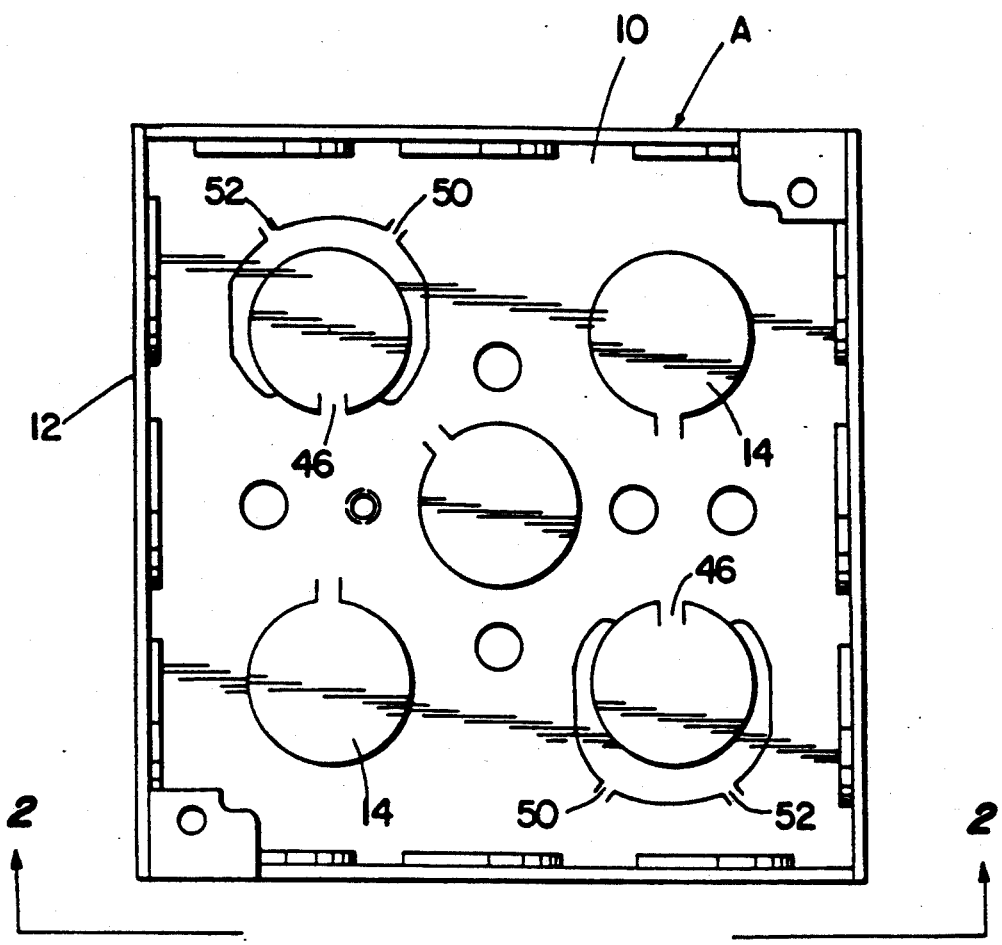
FIG. 1 is a top plan view of an electrical box having the improved knockout arrangement of the present application incorporated therein.
Figure 2:
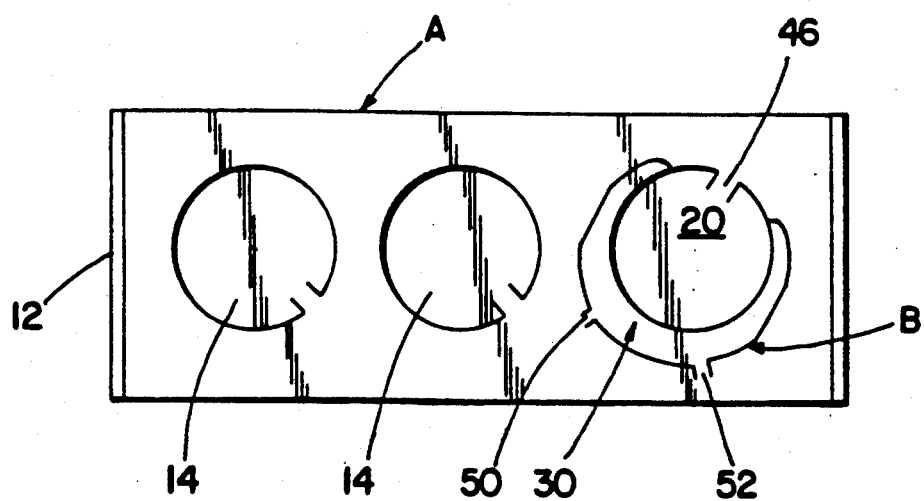
FIG. 2 is a side elevational view taken generally on line 2—2 of FIG. 1.

Referring now to the drawing, wherein the showings are for purposes of illustrating a preferred embodiment of the invention only and not for purposes of limiting same, a metal electrical box A includes a flat bottom wall 10 having a continuous peripheral wall 12 extending upwardly therefrom to define a cavity in which electrical devices are mountable. The peripheral wall of box A has a plurality of spaced-apart conventional knockouts 14 therein, along with a plurality of spaced-apart eccentric knockouts B constructed in accordance with the present application.

Figure 3:
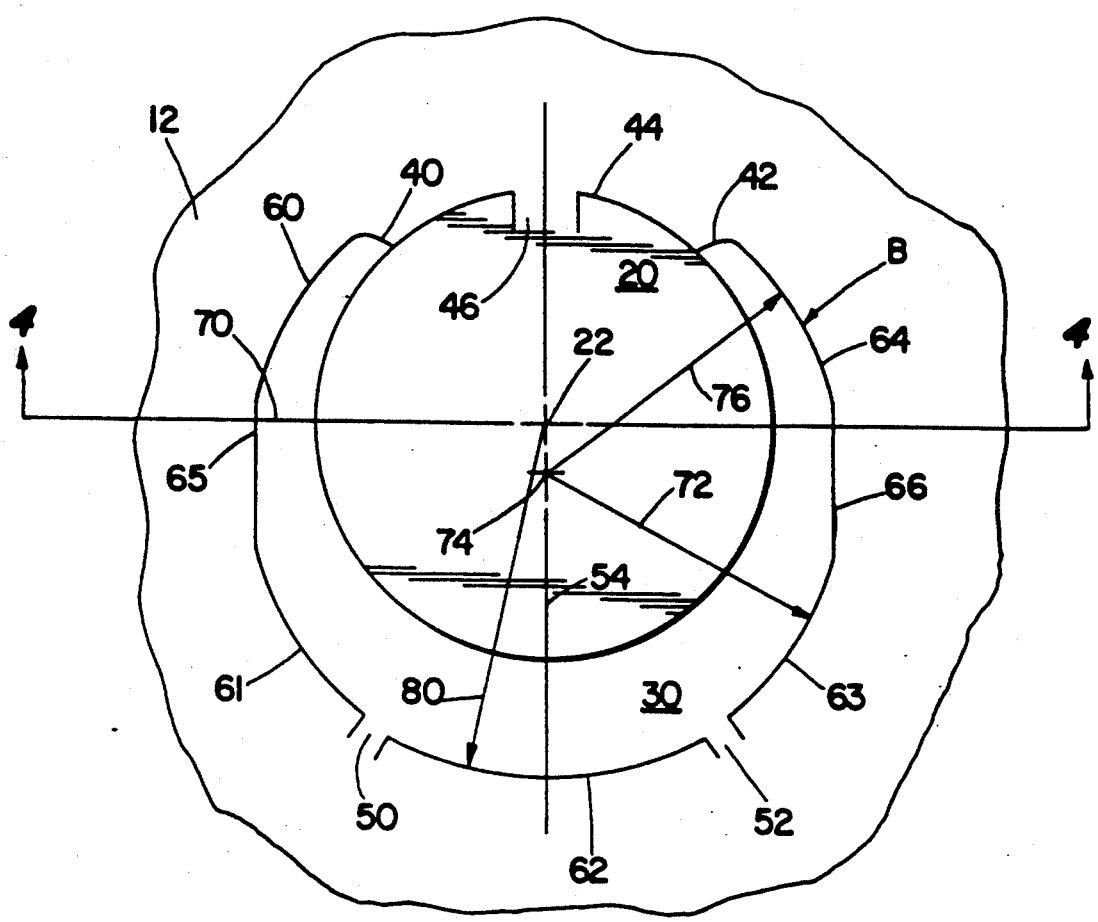
FIG. 3 is an enlarged view of the improved eccentric knockout of the present application.

With reference to FIG. 3, eccentric knockout B includes a circular inner knockout 20 having a center 22 and a circular outer periphery. An outer knockout 30 extends continuously around inner knockout 20 over an arc substantially greater than 180° but less than 360°. In the arrangement shown in FIG. 3, outer knockout 30 continuously surrounds inner knockout 20 over an arc of approximately 280°.

Outer knockout 30 has smoothly curved terminal ends 40, 42. That portion of the outer periphery of inner knockout 20 that extends between outer knockout ends 40, 42 defines a connecting portion 44 that is integrally connected with a box wall by first frangible connecting means defined by a single frangible web 46. This connecting portion 44 is also a common outer peripheral portion for both inner knockout 20 and outer knockout 30. Single web 46 defines the sole connection between inner knockout 20 and the box wall, and the remaining periphery of inner knockout 20 is completely severed from the box wall and from outer knockout 30.

At a location generally opposite from inner knockout connecting portion 44, outer knockout 30 is integrally connected with the box wall by second frangible connecting means defined by a pair of spaced-apart frangible webs 50, 52. Frangible webs 50, 52 together have a total combined strength that is substantially less than the strength of single frangible web 46. Single web 46 may be considered to define a primary frangible connecting web, while webs 50, 52 define secondary frangible connecting webs. Secondary frangible connecting webs 50, 52 are angularly spaced approximately 60° apart. Each of secondary webs 50, 52 is angularly spaced about 30° outwardly from a vertical diametral line 54 extending through center 22 of inner knockout 20 that also bisects primary frangible web 46.

The outer periphery of outer knockout 30 includes a plurality of interconnected discrete circular curved portions 60–64. Discrete circular curved portions 60, 61 and 63, 64 are connected by relatively short straight portions 65, 66 extending substantially parallel to vertical diametral line 54.

A horizontal separating diametral line 70 passing through inner knockout center 22 perpendicular to vertical diametral line 54 may be considered to divide outer knockout 30 into a bottom large area and a top small area. Discrete circular curved portions 61, 63 are curved at a radius 72 about a center 74 located on diametral line 54 on the large area side of diametral line 70. Discrete circular curved portions 60, 64 are curved at a radius 76 that is slightly smaller than radius 72 and has a center coincidental with center 74.

Discrete circular curved portion 62 is a relatively flat curved portion that is curved at a radius 80 having a center substantially coincidental with center 22 of inner knockout 20. Thus, the center of curvature for relatively flat curved portion 62 is spaced toward the small area side of outer knockout 30 from the center of curvature for curved portions 61, 63. With the arrangement shown and described, secondary connecting webs 50, 52 are located at the intersections of relatively flat discrete circular curved portion 62 with curved portions 61, 63.

Obviously, different sizes and dimensional arrangements can be used for the eccentric knockout arrangement of the present application. Examples of dimensions and curvatures will be given by way of illustration. Inner knockout 20 has a diameter of about 0.875 inch. Radius 72 for curved portions 61, 63 is about 0.570 inch and its center 74 is located about 0.087 inch from inner knockout center 22. Radius 76 for curved portions 60, 64 is about 0.565 inch and its center is substantially coincidental with center 74. Radius 80 for curved portion 62 is about 0.657 inch and its center is substantially coincidental with inner knockout center 22. Substantially straight portions 65, 66 are spaced from one another about 1.109 inch. Single primary frangible connecting web 46 extends over an arc of about 16° on the outer periphery of inner knockout 20. Each of secondary frangible connecting webs 50, 52 extends over an arc of about 5° on the outer periphery of outer knockout 30.

The strength of both secondary webs 50, 52 taken together is preferably substantially less than the strength of primary frangible connecting web 46. However, when inner and outer knockouts 20, 30 are punched from the box wall, outer knockout 30 is flattened back into its own opening so that its opposite outer surfaces are substantially flush with the outer surfaces of the box wall from which it was punched.

During the punching operation, the peripheral size of the knockout actually increases slightly. Therefore, when the knockout is forced back into its opening, it is an extremely tight press fit in the opening. Therefore, outer knockout 30 is not only connected to the box wall by secondary webs 50, 52, but also by the frictional and wedging action provided by forcing same back into its opening.

Figure 4:
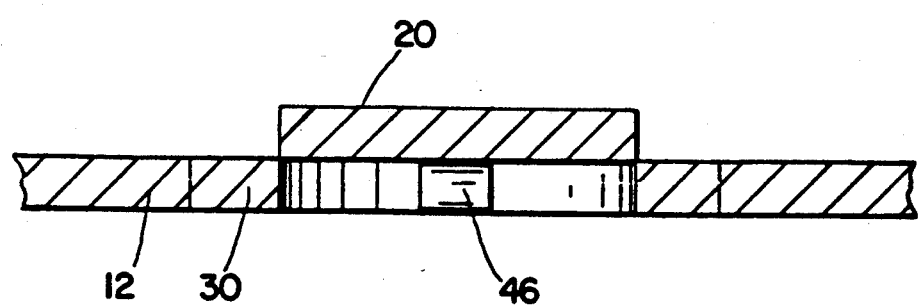
FIG. 4 is a partial cross-sectional elevational view taken generally on line 4—4 of FIG. 3.

Inner knockout 20 remains laterally displaced from the box wall and from outer knockout 30, preferably in a direction inwardly of the cavity defined in the electrical box. Inner knockout 20 is preferably substantially completely laterally displaced from the box wall as shown in FIG. 4. However, it is possible to have one outer surface of the inner knockout located substantially flush with an outer surface of the box wall, or slightly back into the hole left by punching the inner knockout. In other words, inner knockout 20 could be displaced such that one of its outer surfaces lies intermediate the opposite outer surfaces of the box wall and of the outer knockout, while the opposite outer surface of the inner knockout is completely displaced outwardly from the outer surface of the box wall and outer knockout. Regardless of the arrangement, the total force holding outer knockout 30 to the box wall is preferably greater than the total force holding inner knockout 20 to the box wall.

Outer knockout 30 is completely severed from box wall 12 except for highly frangible webs 50, 52. However, force applied to inner knockout 20 during removal thereof will not cause displacement of outer knockout 30. This is because outer knockout 30 is firmly held to the wall by secondary connecting webs 50, 52, and by the frictional wedging action of press fitting the outer knockout back into the opening from which it is punched. In addition, the location of frangible web 46 for inner knockout 20 minimizes the possibility that displacing forces will be imparted to outer knockout 30 during manipulation of inner knockout 20 to break frangible web 46. However, the holding forces on outer knockout 30 are not so great as to prevent easy removal of same.

Outer knockout 30 is removed by first removing inner knockout 20 to provide a hole through outer knockout 30. From the outside of the electrical box, the fat or large area of outer knockout 30 along curved portion 62 is gripped between jaws of pliers. A twisting, rolling motion of the wrist and pliers then removes outer knockout 30 by disrupting the frictional wedging connection along with breaking of secondary webs 50, 52. Obviously, the knockout could be removed by other procedures.

As shown in FIG. 3, the entire area of the box wall outwardly of connecting portion 44 of inner knockout 20 is available to be clamped by a fitting regardless whether a large or small conduit is connected to the box wall. When a large conduit and fitting are used after removal of outer knockout 30, relatively flat curved portion 62 reduces the distance between such curved portion and curved connecting portion 44 of inner knockout 20 for a close fit of the fitting in the opening.

As previously noted, outer knockout 30 does not completely surround inner knockout 20. However, the peripheral shape of outer knockout 30, and its eccentric displacement relative to inner knockout 20, are such that an imaginary curved continuation of outer knockout 30, that uses radius 76 and center 74 to connect curved portions 60, 64, would completely surround inner knockout 20. This is, it would be spaced outwardly from common curved peripheral portion 44. This is preferred over arrangements wherein the curved imaginary continuation of curved portions 60, 64 would intersect or be substantially tangent to the periphery of inner knockout 20.

A fitting attaching a small conduit to the box after removal of small knockout 20 can directly clamp to the box wall along common peripheral portion 44 without having to span a portion of outer knockout 30.

The shape of the outer periphery of outer knockout 30 is such that it appears to be elongated along vertical diametral line 54. However, the horizontal and vertical dimensions of outer knockout 30 along perpendicular lines passing through inner knockout center 22 are substantially the same. Thus, the distance along vertical diametral line 54, from an imaginary extension of connecting portion 44 across web 46 over to the center of flat curved portion 62, is about the same as the distance along horizontal diametral line 70 between straight portions 65, 66.

Inner and outer knockouts 20, 30 share a common outer periphery along connecting portion 44 between outer knockout ends 40, 42. This common outer periphery could extend over an arc substantially less than 180° but greater than 40°. More preferably, the common outer periphery extends over an arc less than 120° and greater than 60°. Most preferably, the arc is between about 70°-90°. In the most preferred arrangement shown in FIG. 3, the common outer periphery extends over an arc of about 80°.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A metal wall having a pair of selectively removable inner and outer knockouts eccentrically located with respect to each other, said inner knockout having an outer periphery including a surrounding peripheral portion that is continuously surrounded by said outer knockout over an arc substantially greater than 180° but less than 360°, said inner and outer knockouts being completely severed from one another and having no unbroken connections therebetween, the remainder of said outer periphery of said inner knockout beyond said surrounded peripheral portion defining a wall connecting portion, unbroken integral frangible first connecting means between said wall and said wall connecting portion of said inner knockout for removably connecting said inner knockout to said wall, unbroken integral frangible second connecting means between said wall and said outer knockout on the opposite side of said inner knockout from said first connecting means for removably connecting said outer knockout to said wall, said second connecting means having a strength substantially less than said first connecting means, said outer knockout being completely severed from said wall and having no unbroken connections therebetween other than said second connecting means.

2. The wall of claim 1 wherein said first connecting means comprises a single frangible primary web located substantially centrally on said wall connecting portion of said inner knockout.

3. The wall of claim 1 wherein said second connecting means comprises a pair of angularly-spaced frangible secondary webs each having a strength substantially less than the strength of said first connecting means.

4. The wall of claim 1 wherein said wall and said inner and outer knockouts have opposite outer surfaces, said outer knockout being positioned with said outer surfaces thereof substantially flush with said outer surfaces of said wall, said inner knockout being displaced from said wall with said outer surfaces of said inner knockout laterally offset from said outer surfaces of said wall.

5. The wall of claim 4 wherein said wall is on an electrical box having a cavity therein and said inner knockout is displaced in a direction inwardly of said cavity.

6. The wall of claim 1 wherein said inner knockout is circular and said outer knockout is non-circular.

7. The wall of claim 1 wherein said outer knockout has an outer periphery that includes a plurality of interconnected discrete circular curved portions that are curved about a plurality of different centers.

8. The wall of claim 7 wherein said inner knockout is circular and said plurality of different centers are all located substantially on a common diameter of said inner knockout.

9. The wall of claim 8 wherein said inner knockout has a center and said plurality of different centers include at least one different center that is substantially coincidental with said center of said inner knockout.

10. The wall of claim 7 wherein said plurality of interconnected discrete circular curved portions include discrete curved portions that have different radii of curvature.

11. The wall of claim 7 wherein at least certain of said plurality of interconnected discrete circular curved portions are connected by substantially straight portions.

12. The wall of claim 7 wherein said plurality of interconnected discrete circular curved portions include a relatively flat curved portion directly opposite from said wall connection portion of said inner knockout, said relatively flat curved portion having a radius of curvature that is substantially greater than the radii of curvature of the remainder of said plurality of interconnected discrete circular curved portions.

13. The wall of claim 12 wherein said inner knockout is circular and has a center, said radius of curvature of said relatively flat curved portion having a center on a diameter of said inner knockout, said radii of curvature for the remainder of said plurality of interconnected discrete circular curved portions also having centers on said diameter and being spaced from said center of said inner knockout and from said center of said relatively flat curved portion.

14. A metal wall having a pair of selectively removable inner and outer knockouts eccentrically located with respect to each other, said inner knockout being integrally connected to said wall by a single frangible web that defines the sole unbroken connection between said inner knockout and said wall, said outer knockout being integrally connected to said wall generally opposite from said single frangible web by a pair of spaced-apart frangible webs that together have a strength less than the strength of said single web and define the sole unbroken connection between said outer knockout and said wall.

15. The wall of claim 14 wherein said outer knockout is substantially flush with said wall and said inner knockout is displaced laterally from said wall and from said outer knockout.

16. A metal wall having a pair of selectively removable inner and outer knockouts eccentrically located with respect to each other, frangible means for connecting each of said inner and outer knockouts to said wall, said inner knockout being circular and having a center, said outer knockout being non-circular and having a plurality of interconnected discrete circular curved portions that are curved about different centers.

17. The wall of claim 16 wherein at least certain of said plurality of discrete circular curved portions have radii of curvature different from the radii of curvature of other of said plurality of discrete circular curved portions.

18. The wall of claim 16 wherein said inner and outer knockouts have a common outer peripheral portion, said plurality of discrete circular curved portions including a relatively flat curved portion opposite from said common peripheral portion, said relatively flat curved portion having a radius of curvature substantially greater than the radius of curvature of the remainder of said plurality of discrete circular curved portions.

19. The wall of claim 18 wherein said plurality of discrete circular curved portions include a pair of curved portions on opposite sides of said relatively flat curved portion.

20. The wall of claim 19 wherein said frangible means between said outer knockout and said wall comprises a pair of frangible webs located at the intersections of said relatively flat curved portion with said pair of curved portions.

21. The wall of claim 19 wherein said relatively flat curved portion and said pair of curved portions extend over an arc not greater than 180°.

22. The wall of claim 16 wherein said outer knockout is divided into large and small areas on opposite sides of a separating diametral line of said inner knockout, each of said large and small areas having discrete circular curved portions that are curved at the same radius of curvature, said discrete circular curved portions being curved about centers located on a common diameter of said inner knockout and spaced from the center of said inner knockout on the large area side of said separating diametral line.

23. The wall of claim 22 wherein said discrete circular curved portions in said large area include a pair of curved portions on opposite sides of a central curved portion that is curved about a center that is spaced toward said small area from the center of said pair of curved portions.

24. The wall of claim 16 wherein said frangible means comprises a single frangible member between said inner knockout and said wall and a pair of frangible members between said outer knockout and said wall, said pair of frangible members being located generally opposite from said single frangible member, and each of said pair of frangible members having a strength substantially less than the strength of said single frangible member.

25. A metal wall having inner and outer knockouts eccentrically located with respect to each other, said outer knockout being non-circular, said inner and outer knockouts sharing a common outer periphery over an arc substantially less than 180° and greater than 40°, and at least one frangible connection between said inner knockout and said wall along said common outer periphery.

26. The wall of claim 25 wherein said arc is less than 120° and greater than 60°.

27. The wall of claim 25 wherein said arc is between about 70–90°.

28. A metal wall having a pair of selectively removable inner and outer knockouts eccentrically located with respect to each other, said inner knockout being substantially circular and having an outer periphery including a surrounding peripheral portion that is continuously surrounded by said outer knockout over an arc substantially greater than 180° but less than 360°, said inner and outer knockouts being completely severed from one another and having no unbroken connections therebetween, the remainder of said outer periphery of said inner knockout beyond said surrounded peripheral portion defining a wall connecting portion, unbroken integral frangible first connecting means between said wall and said wall connecting portion of said inner knockout for removably connecting said inner knockout to said wall, unbroken integral frangible second connecting means between said wall and said outer knockout on the opposite side of said inner knockout from said first connecting means for removably connecting said outer knockout to said wall, said outer knockout having a generally non-circular outer periphery and being completely severed from said wall and having no unbroken connections therebetween other than said second connecting means.

29. The wall of claim 28 wherein said second connecting means has a strength substantially less than said first connecting means.

30. A metal wall having a pair of selectively removable inner and outer knockouts eccentrically located with respect to each other, said inner knockout having an outer periphery including a surrounded peripheral portion that is continuously surrounded by said outer knockout over an arc substantially greater than 180° but less than 360°, said inner and outer knockouts being completely severed from one another and having no unbroken connections therebetween, the remainder of said outer periphery of said inner knockout beyond said surrounded peripheral portion defining a wall connecting portion, unbroken integral frangible first connecting means between said wall and said wall connecting portion of said inner knockout for removably connecting said inner knockout to said wall, unbroken integral frangible second connecting means between said wall and said outer knockout on the opposite side of said inner knockout from said first connecting means for removably connecting said outer knockout to said wall, said outer knockout being completely severed from said wall and having no unbroken connections therebetween other than said second connecting means, said inner and outer knockouts having opposite outer surfaces, said outer knockout being positioned with said outer surfaces, said outer knockout being positioned with said outer surfaces thereof substantially flush with said outer surfaces of said wall, said inner knockout being displaced from said wall with said outer surfaces of said inner knockout laterally offset from said outer surfaces of said wall.

31. A metal wall having a pair of selectively removable inner and outer knockouts eccentrically located with respect to each other, said inner knockout having an outer periphery including a surrounded peripheral portion that is continuously surrounded by said outer knockout over an arc substantially greater than 180° but less than 360°, said inner and outer knockouts being completely severed from one another and having no unbroken connections therebetween, the remainder of said outer periphery of said inner knockout beyond said surrounded peripheral portion defining a wall connecting portion, unbroken integral frangible first connecting means between said wall and said wall connecting portion of said inner knockout for removably connecting said inner knockout to said wall, unbroken integral frangible second connecting means between said wall and said outer knockout on the opposite side of said inner knockout from said first connecting means for removably connecting said outer knockout to said wall, having no unbroken connections therebetween other than said second connecting means, and having an outer periphery that includes a plurality of interconnected discrete circular curved portions that are curved about a plurality of different centers.

* * * * *